(12) United States Patent
Iwanaga et al.

(10) Patent No.: US 8,630,080 B2
(45) Date of Patent: Jan. 14, 2014

(54) ELECTRONIC COMPONENT

(75) Inventors: Toshiyuki Iwanaga, Nagaokakyo (JP);
Makoto Ogawa, Nagaokakyo (JP);
Masahito Saruban, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 32 days.

(21) Appl. No.: 13/411,752

(22) Filed: Mar. 5, 2012

(65) Prior Publication Data

US 2012/0243143 A1  Sep. 27, 2012

(30) Foreign Application Priority Data

Mar. 24, 2011  (JP) ................................. 2011-065425

(51) Int. Cl.
*H01G 4/002*   (2006.01)

(52) U.S. Cl.
USPC ................. 361/301.1; 361/305; 361/301.4; 361/306.1; 361/303; 361/321.1

(58) Field of Classification Search
USPC ............... 361/303, 305, 301.2, 301.4, 306.1, 361/306.3, 321.1–321.2
See application file for complete search history.

(56) References Cited

U.S. PATENT DOCUMENTS

| | | | |
|---|---|---|---|
| 5,985,414 A * | 11/1999 | Fukuda et al. | ................ 428/192 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 8,106,506 B2 * | 1/2012 | Murakami et al. | ............ 257/724 |
| 8,130,484 B2 * | 3/2012 | Koga et al. | .................... 361/303 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |

FOREIGN PATENT DOCUMENTS

WO  2007/049456 A1  5/2007

OTHER PUBLICATIONS

Matsumoto et al.; "Electronic Component and Producing Method Thereof"; U.S. Appl. No. 12/632,823, filed Dec. 8, 2009.
Yamamoto et al.; "Electronic Component and Method for Manufacturing the Same"; U.S. Appl. No. 13/072,932, filed Mar. 28, 2011.

* cited by examiner

*Primary Examiner* — Nguyen T Ha
(74) *Attorney, Agent, or Firm* — Keating & Bennett, LLP (57) ABSTRACT

An electronic component that is prevented from being inclined with respect to a circuit board during and after mounting includes a laminated body that is preferably configured by stacking a plurality of insulator layers, and includes a lower surface with depressions provided thereon. The lower surface includes a series of outer edges of the insulator layers. Capacitor electrodes are defined by internal conductors incorporated in the laminated body, which respectively have exposed sections that are exposed from between the insulator layers in the depressions on the lower surface. External electrodes, which are preferably formed directly by plating, are provided in the depressions to cover the exposed sections.

8 Claims, 5 Drawing Sheets

ELECTRONIC COMPONENT

BACKGROUND OF THE INVENTION

1. Field of the Invention

The present invention relates to an electronic component, and more particularly, relates to an electronic component including a laminated body configured by stacking a plurality of insulator layers.

2. Description of the Related Art

As a conventional electronic component, a laminate-type electronic component is disclosed, for example, in FIG. 8 of WO2007/049456. The laminate-type electronic component disclosed in FIG. 8 of WO2007/049456 includes a laminated body configured by stacking insulator layers, internal electrodes exposed from between the insulator layers at a mounting surface (bottom surface) of the laminated body, and an external electrode for covering the internal electrodes at the mounting surface of the laminated body. The external electrode is provided only on the mounting surface, but not on the other surfaces. Further, the mounting surface is a surface to be opposed to a circuit board in the case of mounting the laminate-type electronic component onto the circuit board.

The laminate-type electronic component as described above has no external electrode provided on the surfaces other than the mounting surface, and thus, solder will not be attached to the surfaces other than the mounting surface (for example, the side surface adjacent to the mounting surface) to form a fillet, when the laminate-type electronic component is mounted. This prevents solder from spreading in a horizontal direction when mounting the laminate-type electronic component, thus allowing multiple laminate-type electronic components to be mounted densely.

However, the laminate-type electronic component disclosed in FIG. 8 of WO2007/049456 has a problem that there is a possibility that the component will be inclined with respect to a circuit board during and after mounting onto the circuit board. More specifically, in the laminate-type electronic component, no fillet is formed, and solder melted during reflow will be located between the external electrode and the circuit board. Therefore, the laminate-type electronic component will become unstable while floating on the melted solder. Accordingly, the laminate-type electronic component will be easily inclined with respect to the circuit board due to external vibrations, etc.

SUMMARY OF THE INVENTION

Therefore, preferred embodiments of the present invention provide an electronic component which is prevented from being inclined with respect to a circuit board during and after mounting.

An electronic component according to a preferred embodiment of the present invention is configured by stacking a plurality of insulator layers, and includes a laminated body which includes a mounting surface with a depression, and an external electrode provided in the depression and formed directly by plating.

According to various preferred embodiments of the present invention, the electronic component can be prevented from being inclined with respect to a circuit board during and after mounting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Electronic components according to preferred embodiments of the present invention will be described below with reference to the drawings.

Figure 1:
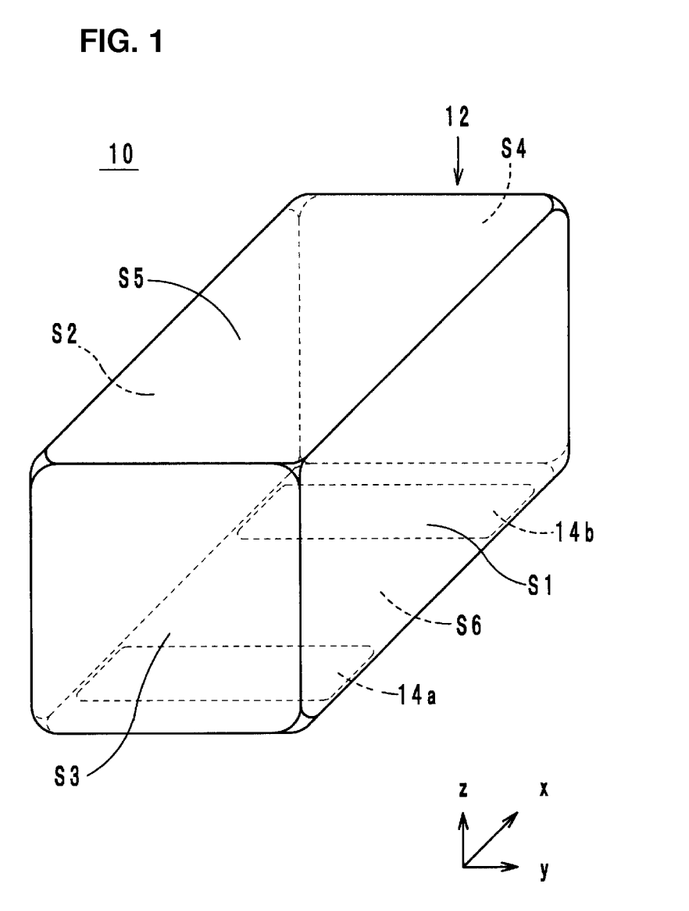
FIG. 1 is a perspective view of the appearance of an electronic component.
Figure 2:
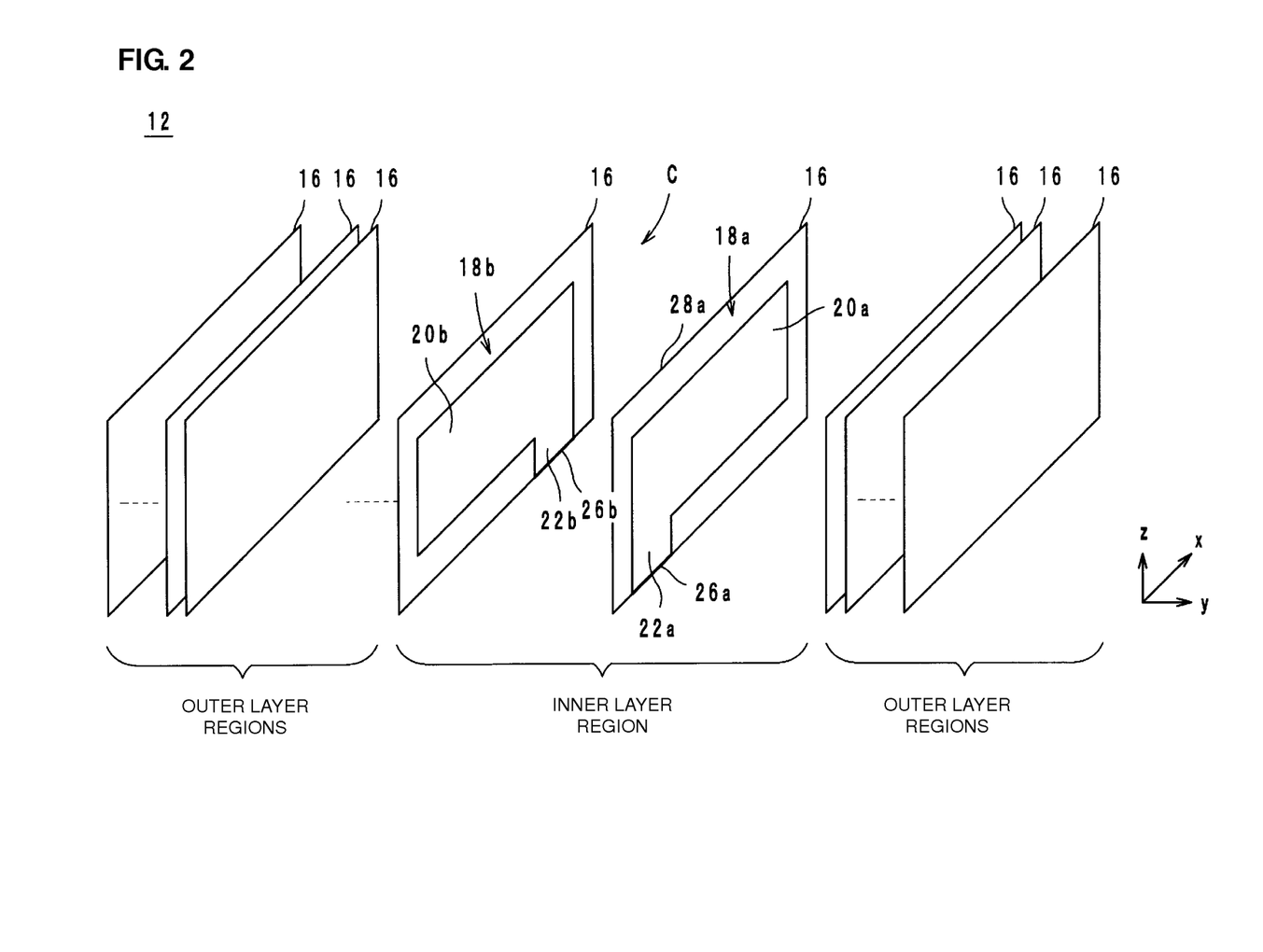
FIG. 2 is an exploded perspective view of a laminated body of the electronic component.
Figure 3:
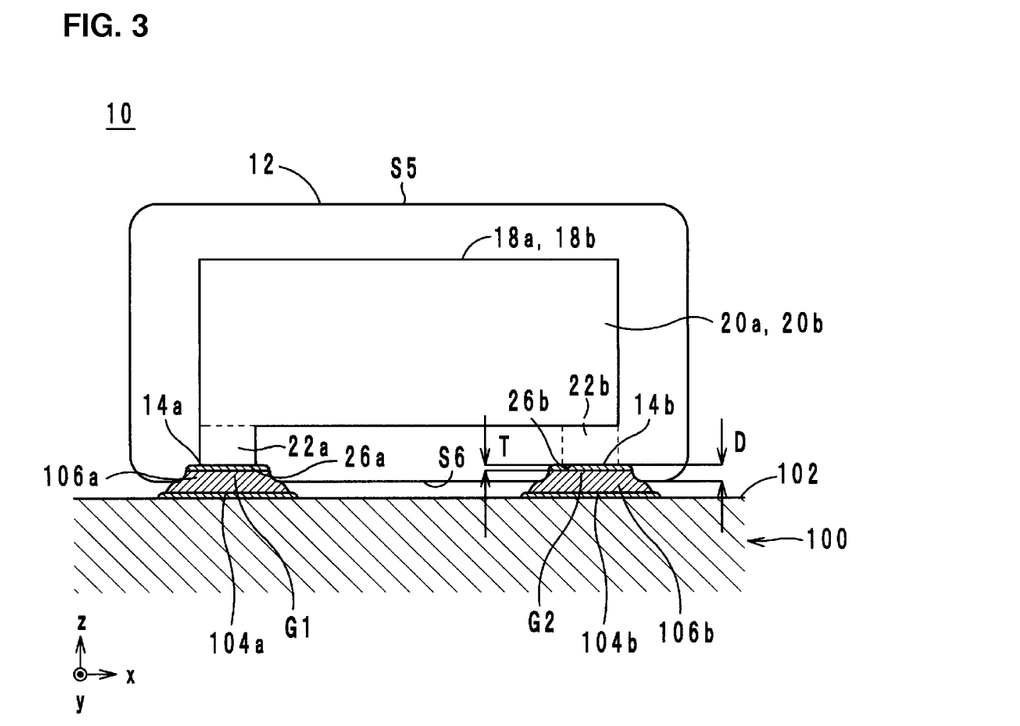
FIG. 3 is a cross-section structure diagram of the electronic component mounted on a circuit board.

First, the structure of an electronic component will be described with reference to the drawings. FIG. 1 is a perspective view of the appearance of an electronic component 10. FIG. 2 is an exploded perspective view of a laminated body 12 of the electronic component 10. FIG. 3 is a cross-section structure diagram of the electronic component 10 mounted on a circuit board 100. The stacking direction of the laminated body 12 is defined as the y-axis direction below. The longer side direction of the laminated body 12 is determined as the x-axis direction, when the laminated body 12 is viewed as a planar view from the y-axis direction. The short side direction of the laminated body 12 is determined as the z-axis direction, when the laminated body 12 is viewed as a planar view from the y-axis direction.

The electronic component 10 is a chip capacitor, which includes, as shown in FIGS. 1 and 2, a laminated body 12, external electrodes 14 (14a, 14b), and a capacitor C (not shown in FIG. 1).

The laminated body 12 preferably has a rectangular parallelepiped shape, for example. However, the laminated body 12 preferably has a chamfered shape rounded at corners and ridge lines. However, FIG. 2 shows the laminated body 12 before being subjected to the chamfering, in which the corners of insulator layers 16 are thus not rounded. Hereinafter, in the laminated body 12, the positive-side surface in the y-axis direction is referred to as a side surface S1, whereas the negative-side surface in the y-axis direction is referred to as a side surface S2. In addition, the negative-side surface in the x-axis direction is referred to as an end surface S3, whereas the positive-side surface in the x-axis direction is referred to as an end surface S4. In addition, the positive-side surface in the z-axis direction is referred to as an upper surface S5, whereas the negative-side surface in the z-axis direction is referred to as a lower surface S6.

The laminated body 12 is configured by stacking a plurality of insulator layers 16 as shown in FIG. 2. The insulator layers 16 that are preferably rectangular or substantially rectangular are prepared from a dielectric ceramic. Examples of the dielectric ceramic include $BaTiO_3$, $CaTiO_3$, $SrTiO_3$, and $CaZrO_3$, for example. In addition, with these materials as a main constituent, a Mn compound, an Fe compound, a Cr compound, a Co compound, or a Ni compound may be used as an accessory constituents. The insulator layers 16 preferably have a thickness of about 0.5 μm or more and about 10 μm or less, for example. Hereinafter, the positive-side principal surface of the insulator layer 16 in the y-axis direction is referred to as a surface, whereas the negative-side principal surface of the insulator layer 16 in the y-axis direction is referred to as a rear surface.

The side surface S1 of the laminated body 12 is defined by the surface of the insulator layer 16 provided on the most positive side in the y-axis direction. The side surface S2 of the laminated body 12 is defined by the rear surface of the insulator layer 16 provided on the most negative side in the y-axis direction. In addition, the end surface S3 is defined by a series of negative-side short sides of the multiple insulator layers 16 in the x-axis direction. The end surface S4 is defined by a series of positive-side short sides of the multiple insulator layers 16 in the x-axis direction. The upper surface S5 is defined by a series of positive-side longer sides of the multiple insulator layers 16 in the z-axis direction. The lower surface S6 is defined by a series of negative-side longer sides of the multiple insulator layers 16 in the z-axis direction. The lower surface S6 is a mounting surface opposed to the principal surface of the circuit board 100 when the electronic component 10 is mounted on the circuit board 100.

The capacitor C preferably includes capacitor conductors (internal conductors) 18 (18a, 18b) embedded in the laminated body 12, as shown in FIG. 2. The capacitor conductors 18 are prepared from a conductive material such as, for example, Ni, Cu, Ag, Pd, an Ag—Pd alloy, or Au, which preferably have a thickness of about 0.3 μm or more and about 2.0 μm or less, for example.

The capacitor conductor 18a is provided on the surface of the insulator layer 16, which has a capacitance forming section 20a and an extracted section 22a. The capacitance forming section 20a that preferably has a rectangular or substantially rectangular shape has no contact with the outer edge of the insulator layer 16. The extracted section 22a projects from near the negative-side end in the x-axis direction, of the negative-side longer side of the capacitance forming section 20a in the z-axis direction, toward the negative side in the z-axis direction. Thus, the extracted section 22a is extracted to the negative-side longer side of the insulator layer 16 in the z-axis direction. The extracted section 22a has, at the negative-side tip in the z-axis direction, an exposed section 26a exposed from between the two adjacent insulator layers 16 at the lower surface S6 of the laminated body 12.

The capacitor conductor 18b is provided on the surface of the insulator layer 16, which includes a capacitance forming section 20b and an extracted section 22b. The capacitance forming section 20b that preferably has a rectangular or substantially rectangular shape does not contact the outer edge of the insulator layer 16. Further, the capacitance forming section 20b is opposed to the capacitance forming section 20a with the insulator layer 16 interposed therebetween. Thus, an electrostatic capacitance is generated between the capacitance forming sections 20a, 20b. The extracted section 22b projects from near the positive-side end in the x-axis direction, of the longer negative-side of the capacitance forming section 20b in the z-axis direction, toward the negative side in the z-axis direction. Thus, the extracted section 22b is extracted to the longer negative-side of the insulator layer 16 in the z-axis direction. The extracted section 22b is located on the more positive side in the x-axis direction than the extracted section 22a. The extracted section 22b includes, at the negative-side tip in the z-axis direction, an exposed section 26b exposed from between the two adjacent insulator layers 16 at the lower surface S6 of the laminated body 12.

The capacitor conductors 18a, 18b configured as described above are provided on the multiple layers of insulator layers 16 so as to be arranged alternately in the y-axis direction. Thus, the capacitor C is constituted in a section where the capacitor conductor 18a and the capacitor conductor 18b are opposed to each other with the insulator layer 16 interposed therebetween. Furthermore, the region of the multiple stacked insulator layers 16 with the capacitor conductors 18 provided thereon is referred to as an inner layer region. In addition, multiple insulator layers 16 with no capacitor conductors 18 provided thereon are stacked on the positive side of the inner layer region in the y-axis direction. Likewise, multiple insulator layers 16 with no capacitor conductors 18 provided thereon are stacked on the negative side of the inner layer region in the y-axis direction. Hereinafter, these two regions of the multiple stacked insulator layers 16 with no capacitor conductors 18 provided thereon are referred to as outer layer regions.

The external electrodes 14a, 14b preferably are formed by plating directly on the lower surface S6 of the laminated body 12 respectively so as to cover the exposed sections 26a, 26b. The external electrode 14a is located on the more negative side in the x-axis direction than the external electrode 14b. As described above, the external electrodes 14 are provided to form the capacitor C between the external electrode 14a and the external electrode 14b. Examples of materials for the external electrodes 14 include, for example, Cu, Ni, and Sn.

Now, the electronic component 10 has a configuration that reliably prevents the electronic component 10 from being inclined with respect to the circuit board 100 during and after mounting. The configuration will be described below in detail.

The lower surface S6 includes depressions G1, G2 formed as shown in FIG. 3. The exposed sections 26a, 26b are exposed respectively in the depressions G1, G2 from between the insulator layers 16. Furthermore, the external electrodes 14a, 14b are provided respectively in the depressions G1, G2. More specifically, the external electrodes 14a, 14b are fitted respectively into the depressions G1, G2 when seen in a planar view from the z-axis direction (the normal direction to the lower surface S6). Further, the thicknesses T of the external electrodes 14a, 14b are smaller than the depths D of the depressions G1, G2. Therefore, the depressions G1, G2 are not completely filled with the external electrodes 14a, 14b, and also depressed more than the section of the lower surface S6 except for the depressions G1, G2 after the formation of the external electrodes 14a, 14b.

The electronic component 10 described above is mounted on the circuit board 100, as shown in FIG. 3. The circuit board 100 includes a substrate main body 102 and lands 104a, 104b. Then, the lower surface S6 provided with the external electrodes 14 is opposed as a mounting surface to the circuit board 100.

Furthermore, the lands 104a, 104b and the external electrodes 14a, 14b are solder mounted to each other with solder 106a, 106b. This soldering mounts the electronic component 10 onto the circuit board 100.

Next, a non-limiting example of a method for manufacturing the electronic component 10 will be described. It is to be noted that FIGS. 1 to 3 are referred to in this description.

First, $BaTiO_3$, $CaTiO_3$, $SrTiO_3$, or $CaZrO_3$ as a main constituent, and a Mn compound, an Fe compound, a Cr compound, a Co compound, or a Ni compound as an accessory constituent are weighed at a predetermined ratio, and put in a ball mill, for blending in a wet manner. The obtained mixture is subjected to drying and then grinding, and the obtained powder is subjected to calcination. The calcined powder obtained is subjected to wet grinding in a ball mill, and then drying, and powdered to obtain a dielectric ceramic powder.

This dielectric ceramic powder with an organic binder and an organic solvent added there to is subjected to mixing in a ball mill. The obtained ceramic slurry is formed by a doctor blade method into sheets on a carrier sheet, and dried to prepare ceramic green sheets to serve as the insulator layers 16. The ceramic green sheets to serve as the insulator layers 16 preferably have a thickness of about 0.5 μm to about 10 μm, for example.

Next, a paste including a conductive material is applied by a method such as a screen printing method or a photolithography method onto the ceramic green sheets to serve as the insulator layers 16, thereby forming the capacitor conductors 18a, 18b. The paste including the conductive material is, for example, a metal powder with an organic binder and an organic solvent added thereto.

Next, the ceramic green sheets to serve as the insulator layers 16 are stacked to obtain an unfired mother laminated body. After this, the unfired mother laminated body is subjected to pressure bonding by isostatic pressing.

Next, the unfired mother laminated body is cut into a predetermined size to obtain a plurality of unfired laminated bodies 12. Then, the surfaces of the laminated bodies 12 are subjected to barrel polishing processing to chamfer the corners and ridge lines of the laminated bodies 12.

Next, the unfired laminated bodies 12 are subjected to firing. The firing temperature is preferably, for example, about 900° C. or more and about 1300° C. or less.

Next, the lower surfaces S6 of the fired laminated bodies 12 are subjected to cutting work with a Leutor power tool to form the depressions G1, G2. The depressions preferably have a depth of, for example, about 0.05 mm or more and about 0.2 mm or less.

Next, the external electrode 14 is preferably formed by a plating method, which preferably is composed of three layers of Cu plating, Ni plating, and Sn plating. Through the steps described above, the electronic component 10 is completed.

The electronic component 10 described above can prevent the electronic component 10 from being inclined with respect to the circuit board 100 during and after mounting. More specifically, in the laminate-type electronic component disclosed in FIG. 8 of WO2007/049456, no fillet is formed, and solder melted during reflow will thus be located between the external electrode and the circuit board. Therefore, the laminate-type electronic component will become unstable while floating on the melted solder. Accordingly, the laminate-type electronic component will be easily inclined with respect to the circuit board due to external vibrations, etc.

On the other hand, in the case of the electronic component 10 according to a preferred embodiment of the present invention, the lower surface S6 as a mounting surface is provided with the depressions G1, G2, and the external electrodes 14a, 14b are provided in the depressions G1, G2. Therefore, when the electronic component 10 is mounted onto the circuit board 100, the solder 106a, 106b will extend into the depressions G1, G2. Thus, the distance from the principal surface of the circuit board 100 to the lower surface S6 of the electronic component 10 is smaller than the distance from the principal surface of the circuit board of the laminate-type electronic component disclosed in FIG. 8 of WO2007/049456 to the mounting surface of the laminate-type electronic component. As a result, the electronic component 10 is stable on the circuit board 100, as compared with the laminate-type electronic component disclosed in FIG. 8 of WO2007/049456. Accordingly, the electronic component 10 has a structure that reliably prevents the electronic component 10 from being inclined with respect to the circuit board 100 during and after mounting thereof.

In addition, the electronic component 10 includes the external electrodes 14a, 14b fitted respectively into the depressions G1, G2, when viewed as a planar view from the z-axis direction. Furthermore, the thicknesses T of the external electrodes 14a, 14b are each smaller than the depths D of the depressions G1, G2. Therefore, the depressions G1, G2 are not completely filled with the external electrodes 14a, 14b, and also depressed more than the section of the lower surface S6 except for the depressions G1, G2 after the formation of the external electrodes 14a, 14b. Accordingly, the solder 106a, 106b moves into the depressions G1, G2. As a result, the electronic component 10 can prevent, with more certainty, the electronic component 10 from being inclined with respect to the circuit board 100 during and after mounting.

In addition, for example, Sn plating is carried out for the external electrodes 14a, 14b. When the use for a long period of time exposes the external electrodes 14a, 14b to air, the Sn plating will have whiskers generated thereon. The whiskers cause, when a plurality of electronic components 10 are mounted densely, short circuits between the adjacent electronic components 10. In contrast, the electronic component 10 includes the external electrodes 14a, 14b fitted respectively into the depressions G1, G2, when viewed as a planar view from the z-axis direction.

Furthermore, the thicknesses T of the external electrodes 14a, 14b are respectively smaller than the depths D of the depressions G1, G2. Therefore, the external electrodes 14a, 14b are covered with the solder 106a, 106b, and thus not brought into contact with air. Accordingly, the external electrodes 14a, 14b are unlikely to cause whiskers. As a result, when electronic components 10 are mounted densely, short circuits are prevented from being caused between the electronic components 10.

In addition, the electronic component 10 includes the external electrodes 14a, 14b preferably formed directly by plating. The thicknesses of the external electrodes 14a, 14b preferably formed directly by plating are smaller than the thickness of an external electrode formed by a printing method, a dip method, or the like. Therefore, when the external electrodes 14a, 14b are formed directly by plating, the depressions G1, G2 are increased in depth after the formation of the external electrodes 14a, 14b. As a result, more solder 106a, 106b will move into and be located in the depressions G1, G2. As described above, the electronic component 10 can prevent, with more certainty, the electronic component 10 from being inclined with respect to the circuit board 100 during and after mounting thereof.

The inventor of the present application carried out the following experiments in order to further clarify the advantageous effects achieved by the electronic component 10 according to a preferred embodiment of the present invention. Specifically, prepared were three types of electronic components (samples) different in the depth D of the depressions G1, G2, and a type of electronic component (sample) with no depressions G1, G2 formed therein. Here are the depths D of the depressions G1, G2 for each sample.

First Sample: 0.05 mm;
Second Sample: 0.1 mm;
Third Sample: 0.2 mm; and
Fourth Sample: 0 mm In addition, here are conditions common to the first sample to fourth sample.

Dimensions of Electronic Component: 0.95 mm×0.5 mm×0.5 mm;
Dimensions of External Electrode: 0.4 mm×0.3 mm;

Material of Insulator Layer: Barium Titanate Based Dielectric Ceramic;

Thickness of Insulator Layer: 5 μm;

Material of Capacitor Conductor: Metal containing Ni as its Main Constituent;

Thickness of Capacitor Conductor: 1.5 μm to 2.0 μm; and

External Electrode: 5 μm Ni Plating and 5 μm Sn Plating on 10 μm Cu Plating.

Next, an example of the condition will be given for the plating method in the preparation of the first sample to the fourth sample.

Cu Plating (First Layer)

Plating Solution: Copper Pyrophosphate (15 g/l); Potassium Pyrophosphate (120 g/l); and Potassium Oxalate (10 g/l)

Bath Temperature: 25° C.

pH: 8.7

Cu Plating (Second Layer)

Plating Solution: "Pyro-Bright Process (Pyro-Bright PY-61 Bath)" from C. Uyemura & Co., Ltd.

Bath Temperature: 55° C.

pH: 8.6

Ni Plating

Ni Concentration: 105 g/l pH: 4.0

Bath Temperature: 55° C.

Sn Plating

Plating Solution: NB-RZS from Ishihara Chemical Co., Ltd.

pH: 4.5

Bath Temperature: 30° C.

Conditions of Barrel for Cu Plating, Ni Plating, and Sn Plating

Barrel: Horizontal Rotation Barrel

Barrel Content: 290 ml

Conductive Media: ϕ1.0 mm, 100 ml

The number of Electronic Components Input: 500 pieces

Electrolytic Condition:

Cu Plating (First Layer) 0.15 A/m$^2$

Cu Plating (Second Layer) 0.30 A/m$^2$

Ni Plating 0.50 A/m$^2$

Sn Plating 0.50 A/m$^2$

In addition, an example of the firing condition will be given for the first sample to the fourth sample.

Type of Furnace: Tunnel Furnace;

In-out Time: 30 minutes;

Top Temperature: 600° C. to 800° C.;

Atmosphere in Furnace: N$_2$ Atmosphere/Oxygen

Partial Pressure: 5 ppm or less

The inventor of the present application, as a first experiment, mounted the first sample to the fourth sample on a circuit board 100 with soldering, and measured the angles formed by the lower surfaces S6 with respect to the principal surface of the circuit board 100 (hereinafter, referred to as inclination angles). The lands 104a, 104b have dimensions of 0.5 mm×0.35 mm. For the application of a solder paste, a mask of 150 μm in thickness was used. In addition, an LF solder paste was used for the solder paste. For the measurement of the inclination angles, a laser-type three-dimensional measurement instrument was used. Table 1 is a table showing the experimental results of the first experiment.

TABLE 1

|  | First Sample | Second Sample | Third Sample | Fourth Sample |
| --- | --- | --- | --- | --- |
| Inclination Angle | 8° | 5° | 2° | 13° |

According to Table 1, the fourth sample with no depressions G1, G2 formed thereon provided an inclination angle of 13°. On the other hand, the first sample to third sample with the depressions G1, G2 formed thereon provided inclination angles of 2° to 8°. Therefore, it is determined that the formation of the depressions G1, G2 prevents the electronic component 10 from being inclined with respect to the circuit board 100.

As a second example, the first sample, the second sample, and the fourth sample were used to check the number of whiskers generated. The evaluation of the number of whiskers generated was carried out by the following method.

First, the first sample, the second sample, and the fourth sample were mounted on a circuit board 100. Then, 500 cycles of a temperature cycle test were carried out in which temperatures of −55° C. to 85° C. were each maintained for 10 minutes. The first sample, second sample, and fourth sample after the temperature cycle test were, around the mounted sections of the samples, observed under a metallograph, and then observed by using a SEM. Table 2 is a table showing the experimental results of the second experiment.

TABLE 2

|  | First Sample | Second Sample | Fourth Sample |
| --- | --- | --- | --- |
| The Number of Whiskers Generated | 1 | 0 | 3 |

According to Table 2, it is determined that the first sample and the second sample have smaller numbers of whiskers generated, as compared with the fourth sample. Therefore, it is determined that the electronic component 10 is unlikely to cause the external electrodes 14a, 14b to generate whiskers.

Figure 4:
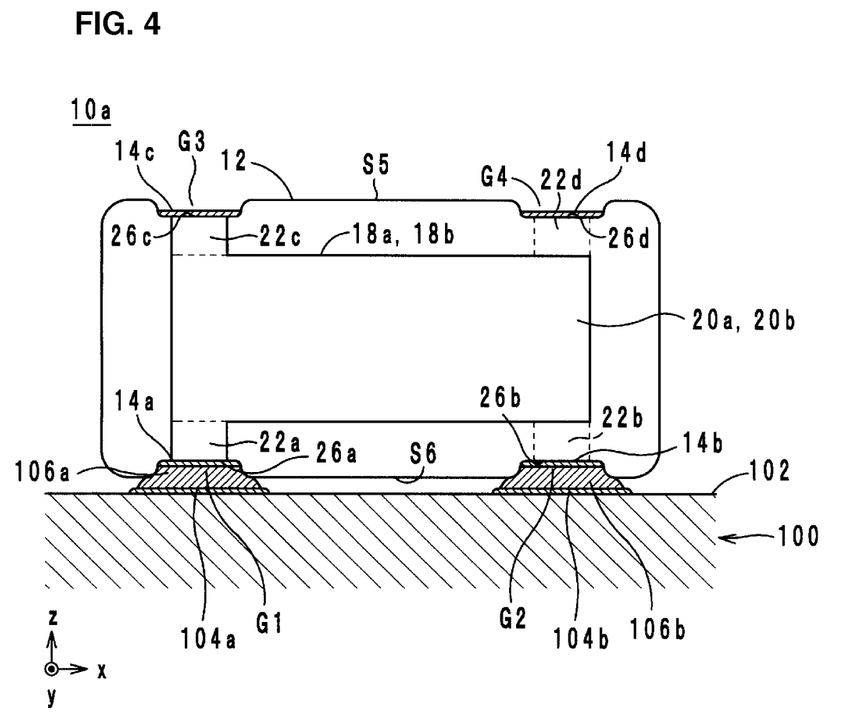
FIG. 4 is a cross-section structure diagram of an electronic component mounted on a circuit board.

Next, an electronic component 10a according to a first modification example will be described with reference to FIG. 4, which is a cross-section structure diagram of the electronic component 10a mounted on a circuit board 100.

The electronic component 10a further includes external electrodes 14c, 14d. In addition, capacitor conductors 18a, 18b further include extracted sections 22c, 22d. In addition, an upper surface S5 is provided with depressions G3, G4.

The extracted sections 22c, 22d respectively have, at the positive-side tips in the z-axis direction, exposed sections 26c, 26d exposed from between the two adjacent insulator layers 16 at the upper surface S5 of the laminated body 12. The exposed sections 26c, 26d are located in the depressions G3, G4. Further, the external electrodes 14c, 14d are provided in the depressions G3, G4 to cover the exposed sections 26c, 26d.

Also in the case of the electronic component 10a as described above, as is the case with the electronic component 10, the electronic component 10a can be prevented from being inclined with respect to the circuit board 100 during and after mounting thereof.

Figure 5:
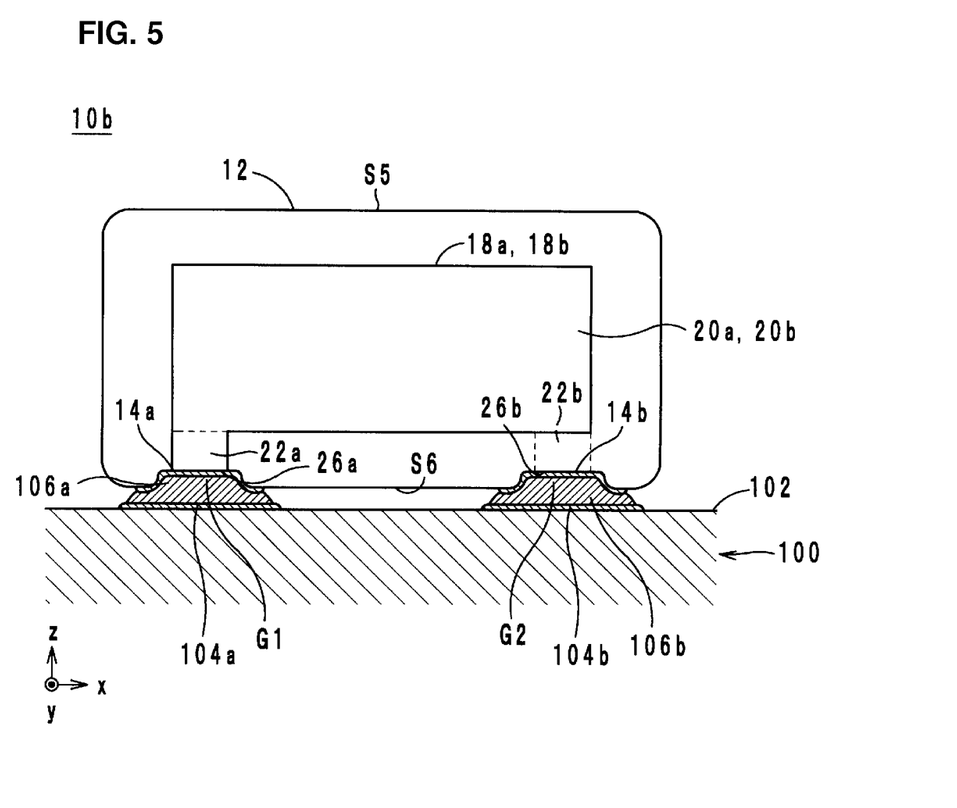
FIG. 5 is a cross-section structure diagram of an electronic component mounted on a circuit board.

Next, an electronic component 10b according to a second modification example will be described with reference to FIG. 5, which is a cross-section structure diagram of the electronic component 10b mounted on a circuit board 100.

In the case of the electronic component 10b, external electrodes 14a, 14b protrude outside depressions G1, G2, when viewed as a planar view from the z-axis direction. Further, the surfaces of the external electrodes 14a, 14b have depressions formed to follow the depressions G1, G2 of a lower surface S6.

Also in the case of the electronic component 10b as described above, as is the case with the electronic component 10, the electronic component 10b can be prevented from being inclined with respect to the circuit board 100 during and after mounting.

The electronic component according to the present invention is not limited to the electronic components 10, 10a, and 10b according to the preferred embodiments described above, and modifications can be made within the scope of the present invention.

It is to be noted that while the electronic components 10, 10a, 10b preferably include capacitors C, circuit elements other than capacitors may be included in the electronic components 10, 10a, 10b.

It is to be noted that while the depressions G1 to G4 are preferably formed by cutting work using a Leutor power tool, for example, the firing conditions may be adjusted to form the depressions G1 to G4, or the depressions G1 to G4 may be formed by sandblast processing, barrel processing, or other suitable processes, for example.

As described above, various preferred embodiments of the present invention are useful for electronic components, and in particular, excellent in that electronic components can be prevented from being inclined with respect to a circuit board during and after mounting.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a laminated body including a plurality of insulator layers stacked on each other and a mounting surface with at least one depression provided thereon;
   an external electrode provided in the at least one depression and defined by a directly plated material; and
   at least one internal conductor included in the laminated body; wherein
   the at least one internal conductor includes an exposed section exposed from the laminated body in the at least one depression of the mounting surface such that the external electrode covers the exposed section.

2. The electronic component according to claim 1, wherein the mounting surface includes a series of outer edges of the insulator layers, and the at least one internal conductor is exposed from between the insulator layers in the at least one depression of the mounting surface.

3. The electronic component according to claim 1, wherein multiple internal electrodes are opposed to each other with the insulator layers interposed therebetween to define an electrostatic capacitance.

4. The electronic component according to claim 1, wherein a thickness of the external electrode is smaller than a depth of the at least one depression.

5. The electronic component according to claim 1, wherein the external electrode is located within the at least one depression when seen in a planar view from a normal direction to the mounting surface.

6. The electronic component according to claim 1, wherein the external electrode protrudes outside the at least one depression when seen in a planar view from a normal direction to the mounting surface, and a surface of the external electrode includes a depression arranged to correspond to the at least one depression of the mounting surface.

7. The electronic component according to claim 1, wherein the mounting surface includes a plurality of depressions.

8. The electronic component according to claim 7, further comprising another external electrode disposed in one of the plurality of depressions.

* * * * *